US012781809B2

(12) United States Patent
Shimanaka

(10) Patent No.: US 12,781,809 B2
(45) Date of Patent: Nov. 3, 2026

(54) SELECTABLE CLUTCH

(71) Applicant: TSUBAKIMOTO CHAIN CO., Osaka (JP)

(72) Inventor: Yoshihito Shimanaka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 19/200,858

(22) Filed: May 7, 2025

(65) Prior Publication Data

US 2025/0369488 A1 Dec. 4, 2025

(30) Foreign Application Priority Data

May 28, 2024 (JP) ................................ 2024-086262

(51) Int. Cl.

*F16D 41/08* (2006.01)
*F16D 41/07* (2006.01)
*F16D 41/22* (2006.01)
*F16D 47/04* (2006.01)

(52) U.S. Cl.

CPC ........... *F16D 41/084* (2013.01); *F16D 41/07* (2013.01); *F16D 41/22* (2013.01); *F16D 47/04* (2013.01)

(58) Field of Classification Search

CPC ........ F16D 41/07; F16D 41/08; F16D 41/084; F16D 41/10; F16D 41/22; F16D 47/04
USPC .............................. 192/45.1, 46, 48.6, 48.92
See application file for complete search history.

(56) References Cited

U.S. PATENT DOCUMENTS 1,936,542 A * 11/1933 Nardone ................ F16D 41/00 192/48.6
2,005,389 A * 6/1935 Pilcher .................. B60K 23/06 192/48.92
2,340,368 A * 2/1944 Dodge .................... F16D 45/00 192/105 CD
2014/0326565 A1 11/2014 Iwano et al.
2022/0056963 A1 2/2022 Nakagawa et al.

FOREIGN PATENT DOCUMENTS

JP H11182589 A 7/1999
JP 2011220509 A 11/2011
JP 2014219015 A 11/2014
JP 2020190255 A 11/2020

* cited by examiner

*Primary Examiner* — Richard M Lorence
(74) *Attorney, Agent, or Firm* — WHDA, LLP

(57) ABSTRACT

Provided is a selectable clutch with a simple structure, offers high responsiveness, operates with reduced backlash and noise, and allows switching with a light force even when a transmission torque is large. In each of rotation transmission paths provided with a first clutch mechanism capable of transmitting rotation between two rotation elements through the wedging effect and a frictional force of a locking member and a second clutch mechanism capable of transmitting rotation by engaging two engagement elements, a buffer element is provided which allows either or both of the engagement elements to move relative to the rotation element to which the engagement element is connected in the circumferential direction.

7 Claims, 6 Drawing Sheets

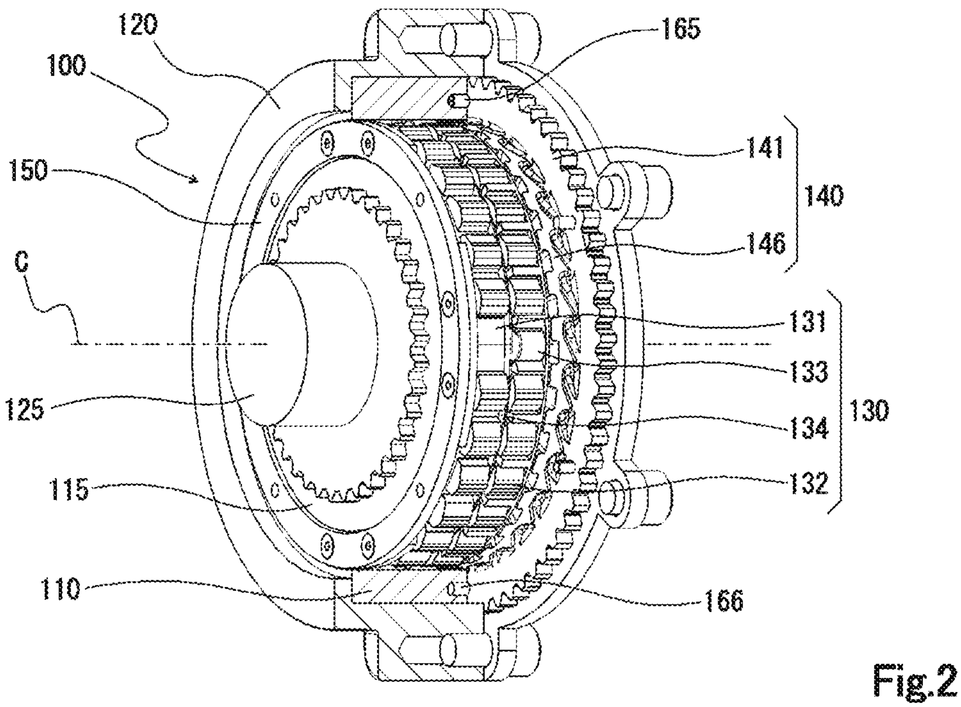
Fig.2
Fig.3
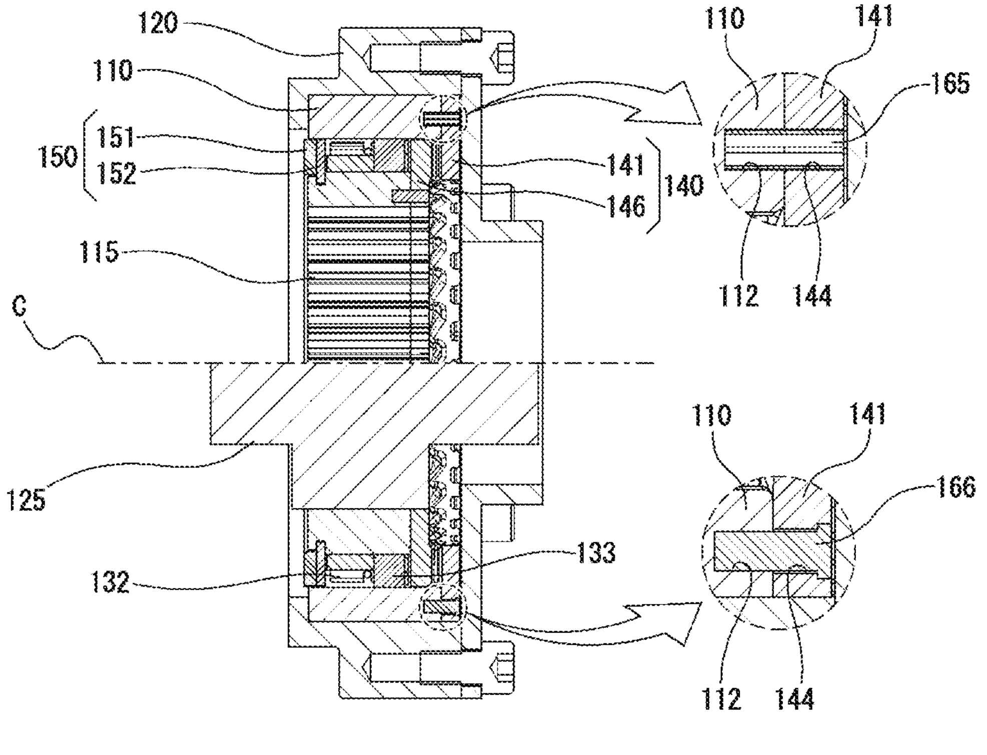

SELECTABLE CLUTCH

BACKGROUND OF THE INVENTION

1. Field of the Invention

The present invention relates to a selectable clutch configured to allow switching of the operation of at least one of a first clutch mechanism that transmits and blocks the rotation of the input shaft in one direction to the output shaft and a second clutch mechanism that transmits and blocks the rotation of the input shaft in the other direction to the output shaft.

2. Description of the Related Art

A two-way clutch, which is known as a clutch for controlling the transmission and blocking of rotation between two shafts, allows switching between driving and idling in both normal and reverse directions.

Although devices incorporating a ratchet clutch or a dog clutch are well known, these devices can transmit rotation only at a prescribed rotational angle and through rigid engagement, which makes backlash likely to occur and causes significant noise.

Certain types of two-way clutches are configured to allow switching between a locked state in which relative rotational movements of inner and outer rings are prohibited (rotational force is transmitted) and a free state in which relative rotational movements of inner and outer rings are permitted (rotational force is blocked) by tilting cams or sprags, and to transmit rotation at an arbitrary rotational angle (see, for example, Japanese Patent Application Publication No. 2011-220509 and Japanese Patent Application Publication No. H11-182589).

Further, Japanese Patent Application Publication No. 2014-219015 discloses a two-way clutch including a switching mechanism capable of switching between three operation modes, a two-way free mode, a one-way lock mode, and a two-way lock mode and transmitting rotation at an arbitrary rotational angle by controlling a cage that holds a roller as a power transmission member in a neutral position or one engagement position of a cam surface formed on the inner circumference of the outer ring.

SUMMARY OF THE INVENTION

In the two-way clutch disclosed in Japanese Patent Application Publication No. 2011-220509, when the input side rotor rotates relative to the output side rotor, the sprags tilt in the same direction as the rotation direction of the input side rotor, thereby switching the engagement and disengagement between the input side rotor and the output side rotor, and therefore when the rotation direction changes, a time loss occurs, resulting in poor responsiveness. The two-way clutch disclosed in Japanese Patent Application Publication No. H11-182589 has the same issue.

Although the two-way clutch disclosed in Japanese Patent Application Publication No. 2014-219015 is capable of transmitting power in both directions simultaneously using a leaf spring-like member, the torque that can be transmitted is small relative to the size of the two-way clutch due to the friction-based power transmission.

In order to address the issues and provide a cam clutch that enables switching between operation modes with a simple structure, offers high responsiveness, and ensures a desired torque capacity, the inventor has invented a cam clutch incorporating the operation mode switching mechanism disclosed in Japanese Patent Application Publication No. 2020-190255.

However, in the clutch types that lock by sandwiching cams or rollers, the cams or rollers can engage at an arbitrary position in each direction, and a slight relative rotation after the start of torque transmission causes the cams or rollers to more firmly bite and transmit torque. Therefore, in the two-way lock mode, even if the rotational torque disappears, a slight relative rotation that occurs when the engagement on one side is released causes the cams or rollers on the other side to bite, and as a result, the bite of the cams or rollers remains in both directions.

In order to switch to the two-way free mode or the one-way lock mode in this state, a force to release the bite of the cams and the rollers is required, and since the degree of engagement increases as the transmission torque increases, a switching mechanism capable of generating a large force should be provided when transmitting a large torque.

The present invention is directed to solving the problems, and it is an object of the present invention to provide a selectable clutch that enables switching between operation modes with a simple structure, offers high responsiveness, ensures a desired torque capacity, operates with reduced backlash and noise, and allows switching with a light force even when the transmission torque is large.

The present invention is directed to a solution to the problems and relates to a selectable clutch including a first shaft element and a second shaft element, one serving as an input shaft and the other serving as an output shaft, a first clutch mechanism provided in a first rotation transmission path for transmitting rotation of the input shaft in one direction to the output shaft, a second clutch mechanism provided in a second rotation transmission path for transmitting rotation of the input shaft in the other direction to the output shaft, and an operating mechanism configured to switch operation of either or both of the first clutch mechanism and the second clutch mechanism, the first clutch mechanism is capable of transmitting rotation at an arbitrary rotational angle through a wedging effect of a locking member arranged in a biased manner by biasing means between a first rotation element and a second rotation element provided coaxially and relatively rotatably and through a frictional force between the locking member and the first rotation element and the second rotation element, the second clutch mechanism is capable of transmitting rotation at an arbitrary rotational angle by engaging an engagement part of a first engagement element connected to the first rotation element and an engagement part of a second engagement element connected to the second rotation element, the selectable clutch has, in each of the first and second rotation transmission paths, a buffer element that allows either or both of the first engagement element and the second engagement element to move in the circumferential direction relative to the rotation element to which the engagement element is connected.

According to the invention of aspect 1, in the two-way lock mode in which rotation in both directions can be transmitted, the first clutch mechanism is capable of transmitting rotation at an arbitrary rotational angle through a wedging effect of a locking member obtained by relative rotation of the first and second rotation elements and through a frictional force, so that backlash-free rotation transmission is enabled in both directions. In the second clutch mechanism, the engagement part of the first engagement element and the engagement part of the second engagement element are engaged in a limited position, and by the function of the buffer element provided in each of the first and second rotation transmission paths, rotational play is generated, during which the clutch mechanisms remains in a disengaged state. Therefore, both the first and second clutch mechanisms are prevented from being engaged simultaneously, so that switching operation can be performed with a light force even when the transmission torque is large.

Furthermore, in the one-way lock mode in which rotation can be transmitted only in one direction, the first clutch mechanism is used for operation while the second clutch mechanism is disengaged, so that relative rotation with extremely small noise and rotation resistance is enabled.

According to the feature of aspect 2, displacement caused by the relative movement between the engagement element and the rotation element is restored by the function of a spring element, so that a state in which rotational play can be generated in preparation for a change in the rotational load condition can be maintained, and it is ensured that the first and second clutch mechanisms do not simultaneously attaining an engagement state.

According to the feature of aspect 3, rotational play can be generated by the backlash of the spline, and the amount of rotational play may correspond, for example, to the amount of elastic deformation occurring in the engagement parts of the first and second engagement elements when the engagement parts engage, and therefore, the rotation element and the engagement element can be relatively rotated without obstructing smooth rotation transmission.

According to the feature of aspect 4, the rotation element and the engagement element are connected with a simple structure using radial spring force, enabling play to be generated by relative movement between the rotation element and the engagement element in the circumferential direction while restoring the displacement caused by the relative movement to attain a state in preparation for a change in the rotational load condition.

According to the feature of aspect 5, since the first clutch mechanism includes a cam-type one-way clutch, the operation mode of the first clutch mechanism can be switched with a simple structure, high responsiveness and a desired torque capacity can be secured.

According to the feature of aspect 6, since the second clutch mechanism includes a ratchet-type one-way clutch, high responsiveness and a desired torque capacity can be secured.

According to the feature of aspect 7, the operation of the second clutch mechanism can be switched by the simple operation of axially moving the operating mechanism.

BRIEF DESCRIPTION OF THE DRAWINGS

FIG. 2 is a partly cutaway perspective view of the selectable clutch shown in FIG. 1;

FIG. 3 is a cross-sectional view of the cam clutch shown in FIG. 1 taken along a plane along the rotational axis;

DESCRIPTION OF THE PREFERRED EMBODIMENTS

Figure 1:
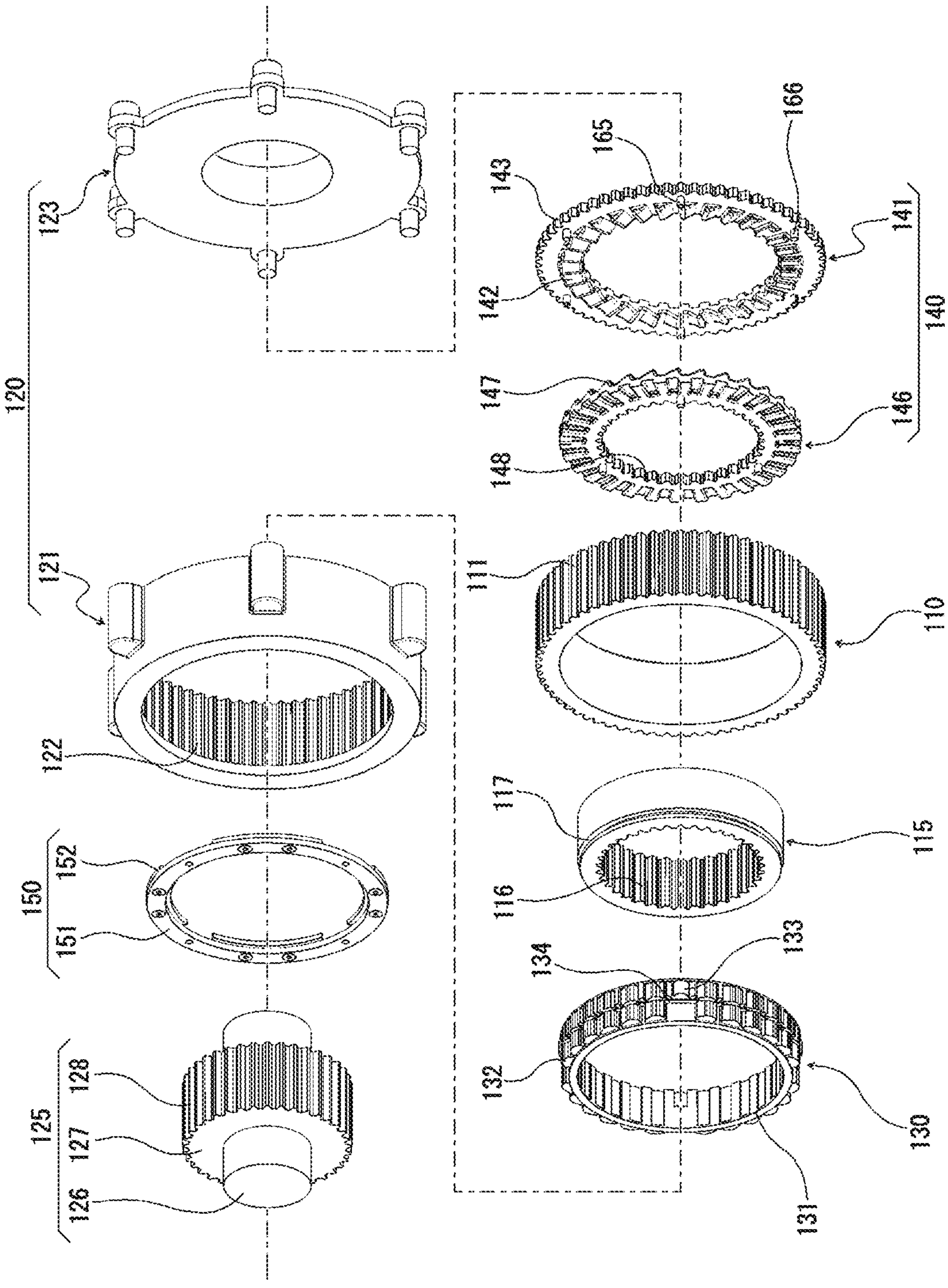
FIG. 1 is an exploded perspective view showing the structure of a selectable clutch according to an embodiment of the present invention.

Embodiments of the present invention will be described with reference to the accompanying drawings. Note, however, that the present invention is not limited by these embodiments.

In a selectable clutch 100 according to one embodiment of the present invention, as shown in FIGS. 1 to 4, a first rotation element includes an outer ring 110, and a second rotation element includes an inner ring 115 provided coaxially and relatively rotatably with the outer ring 110. Reference character C in FIGS. 2 to 4 denotes the rotational axis.

A spline 111 that axially extends is formed on an outer circumferential surface of the outer ring 110.

A spline 116 that axially extends is formed on an inner circumferential surface of the inner ring 115. A circumferential groove 117 that extends over the entire circumference is formed at one axial end on the outer circumferential surface of the inner ring 115.

A first shaft element 120, which is connected to the outer ring 110 as the first rotation element, is configured in a case-like shape capable of storing the outer ring 110 inside and includes a cylindrical shaft part 121 and an annular plate-shaped lid part 123, which is screwed to the other axial end surface of the cylindrical shaft part 121. A spline 122 that axially extends is formed on the inner circumferential surface of the cylindrical shaft part 121.

A second shaft element 125 connected to the inner ring 115, which is the second rotation element, is configured to form a spline coupling structure, for example, by interference fit with the spline 116 of the inner ring 115, and has a solid cylindrical shaft part 126 and a flange part 127, on the outer circumferential surface of which an axially extending spline 128 is provided at a position overlapping the inner ring 115 in the axial direction of the solid cylindrical shaft part 126.

In the following description of the present embodiment, for example, the second shaft element 125 serves as an input shaft and the first shaft element 120 serves as an output shaft, while the first shaft element 120 may serve the input shaft, and the second shaft element 125 may serve as the output shaft.

A first clutch mechanism 130 is provided in a first rotation transmission path that transmits the rotation of the second shaft element 125 in one direction to the first shaft element 120.

The first clutch mechanism 130 is a cam-type one-way clutch having a locking member of a cam 132 and is capable of transmitting the rotation of the first shaft element 120 in one direction to the second shaft element 125 at an arbitrary rotational angle through the wedging effect of the cam 132 and the frictional force between the cam 132 and the outer ring 110 and the inner ring 115.

Specifically, the first clutch mechanism 130 includes a cage ring 131, which is coaxially provided with the outer ring 110 and the inner ring 115 between the outer ring 110 and the inner ring 115 and, a plurality of cams 132 and a plurality of rollers 133 held by the cage ring 131 and arranged in a circumferential direction within an annular space between the inner circumferential surface of the outer ring 110 and the outer circumferential surface of the inner ring 115, and an annular spring 134 as biasing means for biasing each of the plurality of cams 132 into contact with both the outer ring 110 and the inner ring 115.

A second clutch mechanism 140 is provided in a second rotation transmission path that transmits the rotation of the second shaft element 125 in the other direction to the first shaft element 120.

The second clutch mechanism 140 is a ratchet-type one-way clutch capable of transmitting the rotation of the input shaft in the other direction to the output shaft at a prescribed rotational angle by engaging a ratchet pawl 142 and ratchet teeth 147.

The first engagement element includes an annular plate-like ratchet pawl holding member 141 having the ratchet pawl 142 as an engagement part. A spline 143 that extends continuously with the spline 111 of the outer ring 110 in the axial direction is formed on the outer circumferential surface of the ratchet pawl holding member 141.

The second engagement element includes an annular plate-like ratchet tooth holding member 146 having the ratchet teeth 147 as an engaging part. A spline 148 is formed on the inner circumferential surface of the ratchet tooth holding member 146 to form a spline coupling structure, for example by interference fit, with the spline 128 of the second shaft element 125.

In the present embodiment, the ratchet pawl holding member 141 is provided on the other axial end surface of the outer ring 110, and the ratchet tooth holding member 146 is fixed on the other axial end surface of the inner ring 115 so that the ratchet teeth 147 are opposed to the ratchet pawl 142 in the axial direction.

The operating mechanism 150 in the present embodiment is configured to axially move the inner ring 115 relative to the outer ring 110 to cause the ratchet tooth holding member 146 and the ratchet pawl holding member 141 to be in and out of contact with each other, and to switch between a state in which the rotation of the input shaft in the other direction can be transmitted and a state in which the transmission of rotation of the input shaft is blocked in both directions.

Therefore, the selectable clutch 100 allows the operation mode to be switched between a two-way lock mode in which the bi-directional rotation of the second shaft element 125 can be transmitted to the first shaft element 120 and a one-way lock mode in which the rotation of the second shaft element 125 only in one direction can be transmitted to the first shaft element 120 via the first rotation transmission path.

The operating mechanism 150 has an annular plate-like selector member 151 externally fitted to one axial end of the inner ring 115. The selector member 151 is integrally fixed to each of a plurality of partial annular plate-like fixing members 152 mounted in the circumferential groove 117 of the inner ring 115 at positions spaced apart from each other in the circumferential direction.

Thus, the selectable clutch 100 includes, in each of the first and second rotation transmission paths, a buffer element 160 that allows the ratchet pawl holding member 141 to move relative to the outer ring 110 in the circumferential direction, and a spring element that returns the displacement generated by the relative movement of the ratchet pawl holding member 141 and the outer ring 110.

Figure 5:
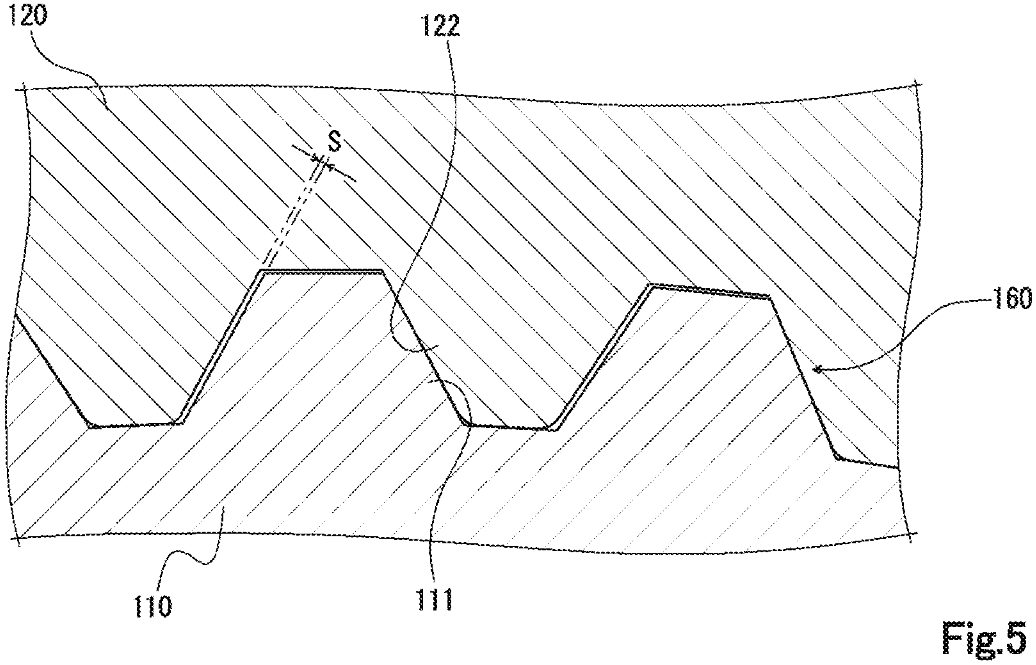
FIG. 5 is a diagram schematically showing the structure of a buffer element.

The buffer element 160 in the present embodiment is provided by connecting the ratchet pawl holding member 141 to the outer ring 110 in a manner that allows relative movement therebetween in the circumferential direction and as shown in FIG. 5, by connecting the outer ring 110 and the ratchet pawl holding member 141 and the first shaft element 120 in a clearance-fit spline coupling structure. The amount of backlash S is set to allow smooth rotation transmission between the outer ring 110 and the first shaft element 120 and corresponds to the amount of elastic deformation of each of the ratchet pawl 142 and the ratchet teeth 147 that occurs during the engagement between the ratchet pawl 142 and the ratchet teeth 147.

Although not shown, the spline coupling structure between the ratchet pawl holding member 141 and the first shaft element 120 is also provided in the same manner as the spline coupling structure between the outer ring 110 and the first shaft element 120.

The ratchet pawl holding member 141 and the outer ring 110 are connected by a first spring pin 165 and a solid pin member 166. The ratchet pawl holding member 141 and the outer ring 110 are connected with the pin member 166, which prevents unintended detachment of the ratchet pawl holding member 141 from the outer ring 110.

As shown in FIG. 3, the first spring pin 165 is formed by rolling an elastic thin plate into a cylindrical shape, with a cut extending in a direction crossing the circumferential direction and is inserted into an insertion hole 112 provided in the outer ring 110 and a through-hole 144 provided in the ratchet pawl holding member 141 to elastically expand in the radial direction.

As shown in FIG. 3, the pin member 166 is fitted into the insertion hole 112 provided in the outer ring 110 and inserted into the through-hole 144 provided in the ratchet pawl holding member 141 with a gap formed between the pin member 166 and the through-hole 144. The gap is set to be larger than the amount of backlash S, so that the relative movement (relative rotation) of the ratchet pawl holding member 141 in the circumferential direction relative to the outer ring 110 is not obstructed.

In the present embodiment, the first spring pins 165 and the pin members 166 are arranged alternately at equal intervals on the same circumference centered on the rotational axis.

The spring element in each of the first and second rotation transmission paths includes a first spring pin 165 that elastically fastens the outer ring 110 and the ratchet pawl holding member 141 and can return displacement generated by the movement of the ratchet pawl holding member 141 relative to the outer ring 110.

In the present embodiment, the number of the first spring pins 145 is three, but the number of the first spring pins 145 is not limited and may be adjusted, so that the load associated with the relative movement of the ratchet pawl holding member 141 in the circumferential direction relative to the outer ring 110 can be adjusted as appropriate.

The operation of the selectable clutch 100 having the structure as described above will be described.

Figure 4:
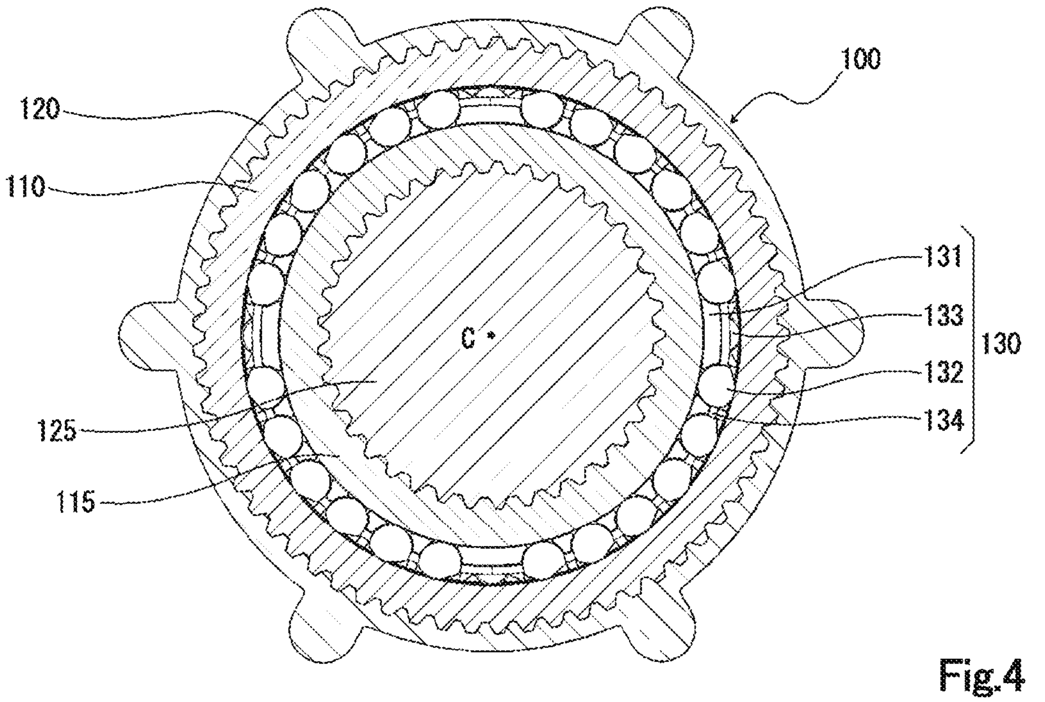
FIG. 4 is a cross-sectional view of the selectable clutch shown in FIG. 1 taken along a plane perpendicular to the rotational axis.

In the states shown in FIGS. 2 to 4, the operation mode of the selectable clutch 100 is set to the two-way lock mode, and the rotation of the second shaft element 125 in one direction can be transmitted to the first shaft element 120 via the first clutch mechanism 130, and the rotation of the second shaft element 125 in the other direction can be transmitted to the first shaft element 120 via the second clutch mechanism 140.

Figure 6:
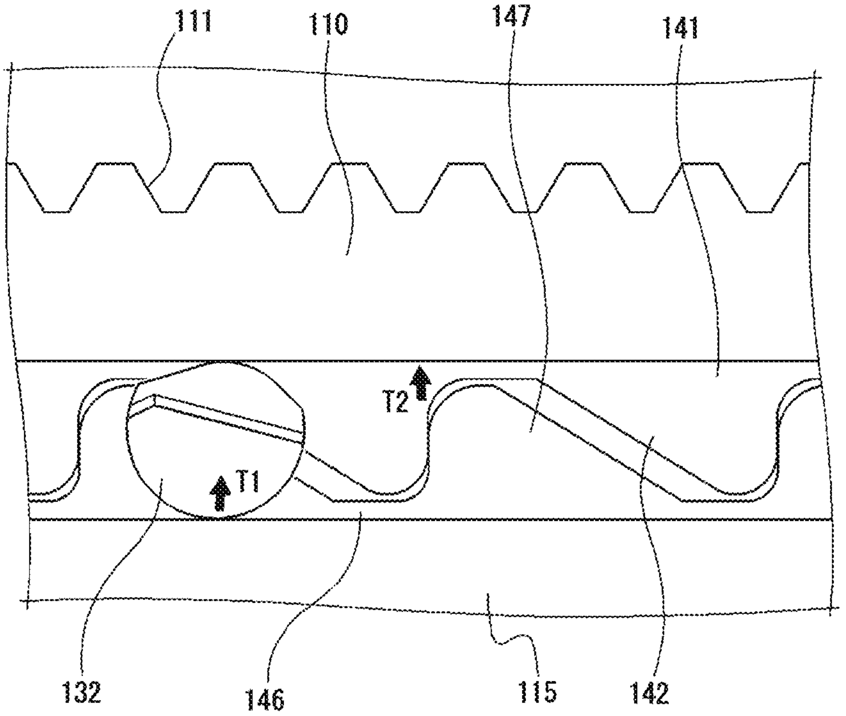
FIG. 6 is a schematic view showing a state in which a bite occurs.

Thus, in the structure that simply combines a cam-type one-way clutch and a ratchet-type one-way clutch, in the two-way lock mode, when the input torque to the second shaft element 125 is switched and the rotational load condition changes, slight torques T1 and T2 opposing the input torque act on both the cams 132 and the ratchet mechanism including the ratchet pawl 142 and the ratchet teeth 147 as shown in FIG. 6.

However, the above-described selectable clutch 100 includes the buffer element 160 and the first spring pin 165 as the spring element in each of the first and second rotation transmission paths, and when the rotational load condition changes, relative rotation between the outer ring 110 and the ratchet pawl holding member 141 generates rotational play, during which the clutch mechanism remains in a disengaged state.

Figure 7A:
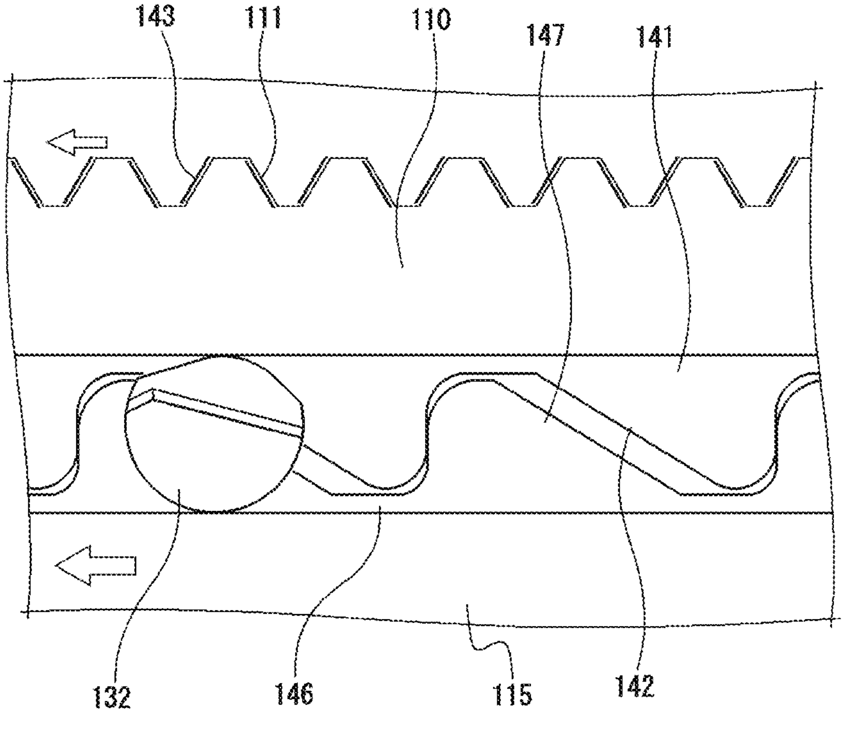
FIG. 7A is a schematic view showing the state where the ratchet pawl is moved to a position where it engages the ratchet teeth when the operation mode of the selectable clutch shown in FIG. 1 is in the two-way lock mode.
Figure 7B:
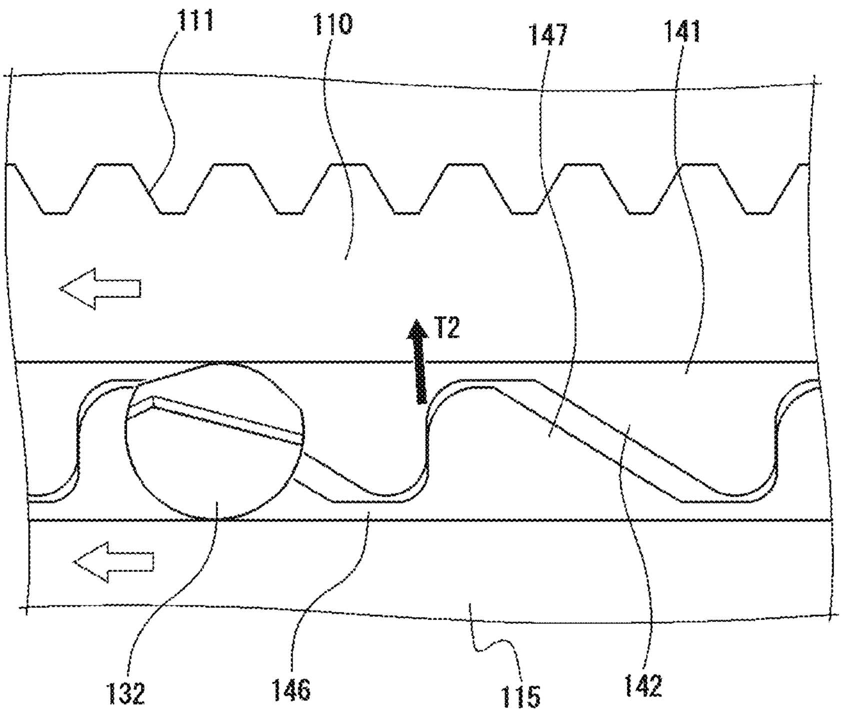
FIG. 7B is a schematic view showing a state when rotation is transmitted by the second clutch mechanism.

Specifically, when the rotational load condition is switched from the state where the cams 132 are engaged with the outer ring 110 and the inner ring 115 by input of rotational torque in one direction to the second shaft element 125 to the state where rotational torque in the other direction is input to the second shaft element 125, the ratchet pawl 142 and the ratchet teeth 147 are brought into contact with each other as shown in FIG. 7A, so that the ratchet pawl holding member 141 moves relative to the outer ring 110 by the amount of backlash S in the circumferential direction. FIG. 7A shows the state where the spline 143 of the ratchet pawl holding member 141 is displaced relative to the spline 111 of the outer ring 110 in an exaggerated manner. While the ratchet pawl holding member 141 is moved relative to the outer ring 110, the torque (T1 shown in FIG. 6) acting on the cam 132 disappears. When the ratchet pawl holding member 141 moves relative to the outer ring 110 by the amount of backlash S and the spline 143 of the ratchet pawl holding member 141 is brought into contact with the spline 122 of the first shaft element 120, as shown in FIG. 7B, the engagement of the ratchet pawl 142 and the ratchet teeth 147 causes the torque T2 to act and transmit the rotation to the first shaft element 120, while the biasing force of the first spring pin 165, which is a spring element, restores the rotational angular positional relationship between the ratchet pawl holding member 141 and the outer ring 110 to its original state.

Figure 8A:
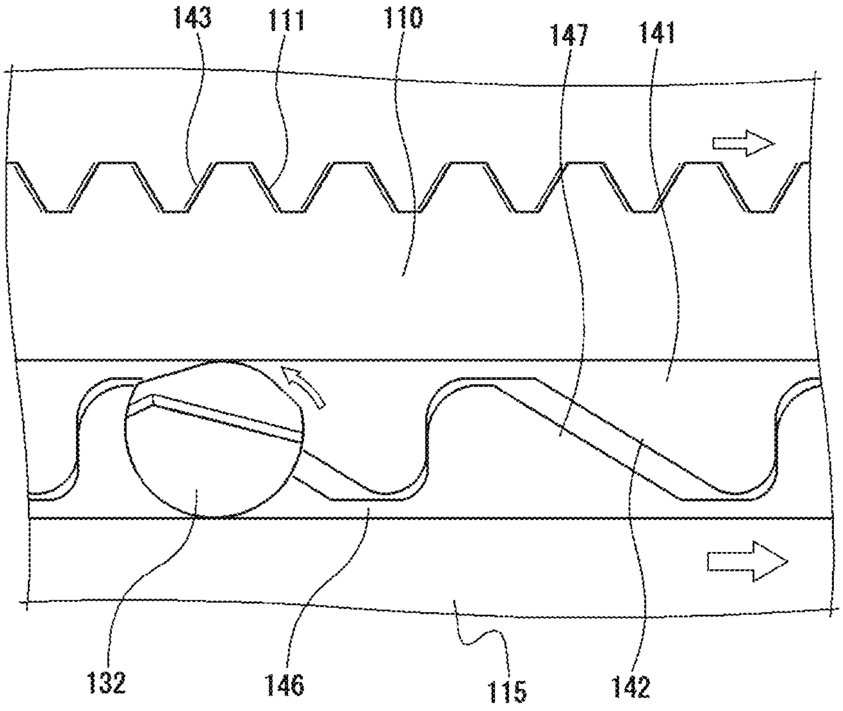
FIG. 8A is a schematic view showing the state where the cam engagement in the first clutch mechanism is started when the operation mode of the selectable clutch shown in FIG. 1 is the two-way lock mode.
Figure 8B:
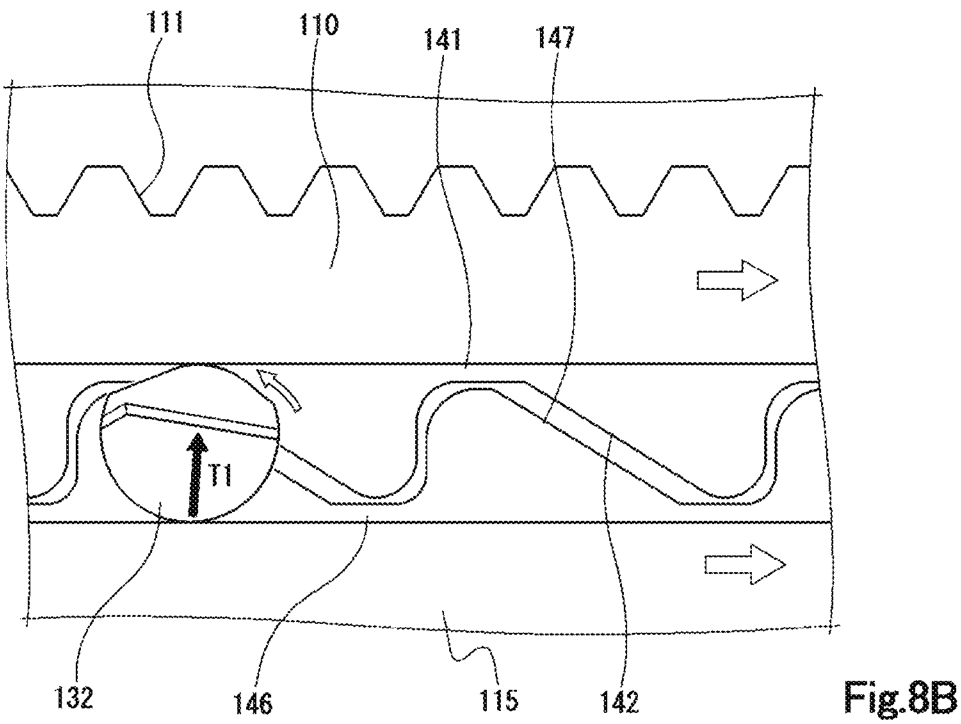
FIG. 8B is a schematic view showing the state where rotation is transmitted by the first clutch mechanism.

When the rotational load condition is switched from the state where the ratchet pawl 142 and the ratchet teeth 147 are engaged by the input of rotational torque in the other direction to the second shaft element 125 to the state where rotational torque in one direction is input to the second shaft element 125, the outer ring 110 moves relative to the ratchet pawl holding member 141 by the amount of backlash S in the circumferential direction by the wedging effect and a frictional force by the start of rotation of the cam 132 as shown in FIG. 8A. FIG. 8A shows the state where the spline 111 of the outer ring 110 is displaced relative to the spline 143 of the ratchet pawl holding member 141 in an exaggerated manner. While the outer ring 110 rotates relative to the ratchet pawl holding member 141, the torque (T2 shown in FIG. 6) acting on the ratchet mechanism due to the elastic deformation of the ratchet pawl 142 and the ratchet teeth 147 generated during engagement disappears. When the outer ring 110 rotates relative to the ratchet pawl holding member 141 by the amount of backlash S and the spline 111 of the outer ring 110 is brought into contact with the spline 122 of the first shaft element 120, as shown in FIG. 8B, the cam 132 engages the outer ring 110 and the inner ring 115 to cause the torque T1 to act and transmit the rotation to the first shaft element 120, while the biasing force of the first spring pin 165, which is a spring element, restores the rotational angular positional relationship between the ratchet pawl holding member 141 and the outer ring 110 to its original state.

As in the foregoing, in the selectable clutch 100 according to the present embodiment, rotational play is created when the rotational load condition changes, and therefore both the first and second clutch mechanisms 130 and 140 are prevented from being engaged simultaneously, so that switching operation can be performed with a light force even when the transmission torque is large.

In the present embodiment, the operation mode of the selectable clutch 100 can be switched by operating the operating mechanism 150 to slide the inner ring 115 in the axial direction.

Figure 9:
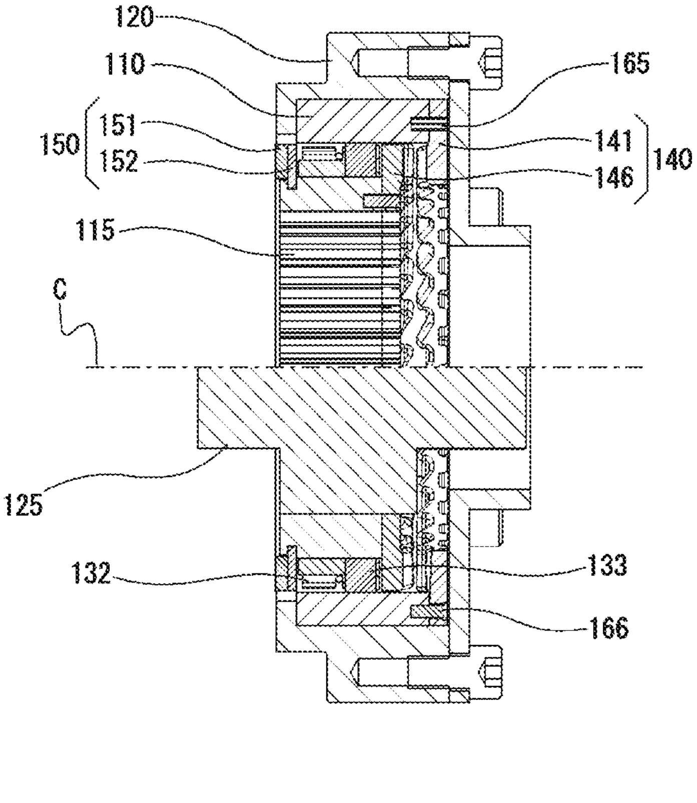
FIG. 9 is a cross-sectional view taken along a plane along the rotational axis when the operation mode of the selectable clutch shown in FIG. 1 is the one-way lock mode.

For example, when the operating mechanism 150 is operated to slide the inner ring 115 toward one axial end in the state where the operation mode of the selectable clutch 100 is set to the two-way lock mode, as shown in FIG. 9, the ratchet tooth holding member 146 is axially spaced apart from the ratchet pawl holding member 141, and even if rotational torque in the other direction is input to the second shaft element 125, the ratchet pawl 142 and the ratchet teeth 147 remain in a disengaged state. In this state, only the rotation of the second shaft element 125 in one direction can be transmitted to the first shaft element 120 via the first clutch mechanism 130, in other words, the operation mode of the selectable clutch 100 is in the one-way lock mode.

While the embodiments of the present invention have been described in detail, the present invention is not limited by the above embodiments, and various design changes can be made without departing from the invention recited in the aspects.

In the above embodiments, the buffer element and the spring element are provided in each of the first and second rotation transmission paths, but if at least the buffer element is provided, the engagement element and the rotation element can be moved relative to each other in the circumferential direction. In other words, the spring element does not have to be provided in the first and second rotation transmission paths.

Although the first clutch mechanism includes a cam type one-way clutch in the above embodiment, the first clutch mechanism may alternatively include a roller-type one-way clutch, in which a cam surface is formed on at least one of the inner circumferential surface of the outer ring and the outer circumferential surface of the inner ring, and a roller, which serves as a locking member, engages with the outer ring and the inner ring by the wedging effect and a frictional force caused by a slight movement of the roller. In the above embodiments, the second clutch mechanism includes a ratchet-type one-way clutch in which a ratchet pawl and ratchet teeth are arranged to oppose each other in the axial direction, but the ratchet pawl and the ratchet teeth may be arranged to oppose each other in the radial direction. Also, the second clutch mechanism may include a dog clutch that transmits rotation between the two rotation elements by engaging dog teeth arranged at intervals in the circumferential direction with each of the two rotation elements.

Furthermore, in the above embodiments, the buffer element is provided by connecting the outer ring and the ratchet pawl holding member to the first shaft element to form a spline coupling structure by clearance fit, but the buffer element may be provided by connecting the outer ring and the ratchet pawl holding member to the first shaft element to form a spline coupling structure by clearance fit and by connecting the inner ring and the ratchet teeth holding member to the second shaft element to form a spline coupling structure by clearance fit. Also, in the structure in the above embodiments, the inner ring and the ratchet tooth holding member may be connected to the second shaft element to form a spline coupling structure by clearance fit. In the structure, the inner ring and the ratchet tooth holding member may be elastically fastened using the second spring pin.

Furthermore, the spring element may be a spring member other than a spring pin.

In addition, although in the above description of the embodiments, the operation mode can be switched between the two-way lock mode and the one-way lock mode, for example, the operating mechanism may be operated to slide axially to cause the cam in the first clutch mechanism to separate from the inner ring, so that the operation mode may be switched between modes including a two-way free mode in which the bi-directional rotation transmission of the input shaft is interrupted. In the above embodiment, the operating mechanism is operated to axially slide the inner ring, but the outer ring may be axially slid.

Furthermore, although in the above description of the embodiments, the case-shaped cylindrical shaft is provided as the first shaft element, a rod-like shaft may be arranged to extend along an axis extending parallel to the rotational axis of the selectable clutch.

What is claimed is:

1. A selectable clutch comprising:

a first shaft element and a second shaft element, one serving as an input shaft and the other serving as an output shaft; a first clutch mechanism provided in a first rotation transmission path for transmitting rotation of the input shaft in one direction to the output shaft; a second clutch mechanism provided in a second rotation transmission path for transmitting rotation of the input shaft in the other direction to the output shaft; and an operating mechanism configured to switch operation of either or both of the first clutch mechanism and the second clutch mechanism, the first clutch mechanism being capable of transmitting rotation at an arbitrary rotational angle through a wedging effect of a locking member arranged in a biased manner by biasing means between a first rotation element and a second rotation element provided coaxially and relatively rotatably and through a frictional force between the locking member and the first rotation element and the second rotation element, the second clutch mechanism being capable of transmitting rotation at a prescribed rotational angle by engaging an engagement part of a first engagement element connected to the first rotation element and an engagement part of a second engagement element connected to the second rotation element, the selectable clutch having, in each of the first rotation transmission path and the second rotation transmission path, a buffer element that allows either or both of the first and second engagement elements to move in the circumferential direction relative to either or both of the first and second rotation elements to which the either or both of the first and second engagement elements is connected.

2. The selectable clutch according to claim 1, further comprising a spring element configured to return displacement caused by either or both of (i) the relative movement between the first rotating element and the first engaging element and (ii) the relative movement between the second rotating element and the second engaging element in each of the first rotation transmission path and the second rotation transmission path.

3. The selectable clutch according to claim 2, wherein the spring element comprises either or both of a first spring pin configured to elastically fasten the first rotation element and the first engagement element and a second spring pin configured to elastically fasten the second rotation element and the second engagement element.

4. The selectable clutch according to claim 1, wherein the buffer element is formed by connecting the first rotation element and the first engagement element and the first shaft element to form a clearance-fit spline coupling structure or by connecting the second rotation element and the second engagement element and the second shaft element to form a clearance-fit spline coupling structure.

5. The selectable clutch according to claim 1, wherein the first rotation element and the second rotation element comprise an outer ring and an inner ring, respectively, wherein the locking member includes a plurality of cams provided in a circumferential direction between the outer ring and the inner ring, and the biasing means is configured to bias the plurality of cams to be in contact with the outer ring and the inner ring.

6. The selectable clutch according to claim 5, wherein the first engagement element and the second engagement element are arranged to axially oppose each other, and the operating mechanism is capable of axially moving the first engagement element or the second engagement element.

7. The selectable clutch according to claim 1, wherein the first engagement element and the second engagement element are arranged to oppose each other, one having ratchet teeth as the engagement part and the other having a ratchet pawl as the engaging part.

* * * * *